Patented Feb. 18, 1936

2,031,058

UNITED STATES PATENT OFFICE 2,031,058

VAT-DYESTUFFS OF THE ANTHRAQUINONE SERIES AND PROCESS OF MAKING THE SAME

Wilhelm Moser, Riehen, and Walter Fioroni, Binningen, Switzerland, assignors to the firm Society of Chemical Industry in Basle, Basel, Switzerland No Drawing. Application March 13, 1935, Serial No. 10,915. In Switzerland March 17, 1934

4 Claims. (Cl. 260—36)

The present invention relates to dyestuffs of the anthraquinone series. It comprises the process of making these dyestuffs as well as the new products themselves.

It has been found that valuable new dyestuffs are obtained by condensing the brombenzanthrones of the general formula

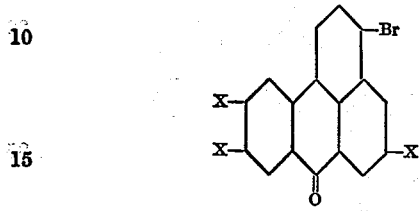

in which one X stands for a methyl group and the other two X's stand for hydrogen atoms, with such 1-aminoanthraquinone compounds whose 2-position is unoccupied, and by treating the intermediate products thus obtained of the general formula

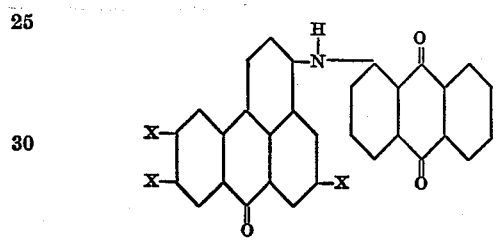

in which one X also stands for a methyl group and the other two X's stand for hydrogen atoms, with alkaline condensing agents. Ring closure takes then place with formation of products of the general formula

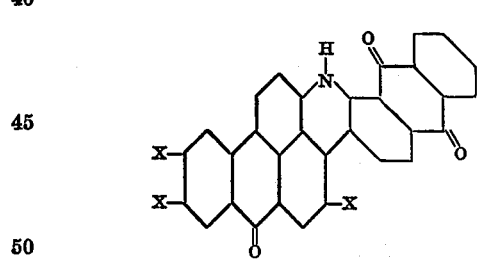

in which the three X's have again the signification indicated above. These new products are dark olive powders, dissolving in sulfuric acid to brown solutions which gradually change to olive-green. They yield reddish-blue vats which dye vegetable fibers tints which, after exposure to the air and soaping, are very fast green-olive to brown-olive.

Among the mono-brominated benzanthrones of the above explained Formula I there may be used above all those benzanthrones which are obtained by mono-brominating the corresponding methylbenzanthrones or mixtures thereof in a sulfuric acid of not greater than 95 per cent. strength (cf. application Serial No. 10,914). Such a methylbenzanthrone mixture is for example obtained in such a manner that from the methylbenzanthrone mixture obtained itself in known manner from 2-methylanthraquinone, the 2-methylbenzanthrone of melting point 199° C. is removed by dissolution in glacial acetic acid and crystallization, and that the mother liquors of the glacial acetic acid crystallization are diluted with water. As 1-aminoanthraquinone derivatives having an unoccupied 2-position there may be used above all the α-aminoanthraquinone. There may, of course, also be used other α-aminoanthraquinones with an unoccupied 2-position, such as, for example, 1-amino-4-benzoyl-aminoanthraquinone or 1-amino-5-benzoylaminoanthraquinone.

The following example illustrates the invention, the parts being by weight:—

32.3 parts of the mono-brominated product of a mixture of monobrombenzanthrones obtained by mono-brominating a technical mixture consisting of 3-, 6- and 7-mono-methylbenzanthrones, 24 parts of 1-amino-anthraquinone, 16 parts of calcined sodium carbonate and 1 part of copper chloride are heated together to boiling with 360 parts of nitrobenzene in a reflux apparatus for 20 hours. After cooling, the whole is filtered and the solid matter washed with nitrobenzene and alcohol. There is obtained a red-brown condensation product soluble in sulfuric acid to an olive solution.

20 parts of this product are introduced gradually at 140–150° C. into a mass of 125 parts of potassium hydroxide and 125 parts of alcohol. The mass is maintained for 1 hour at 150–155° C., then introduced into water and the solution of the leuco-compound thus obtained is treated with air until the dyestuff has been precipitated. After filtering and drying there is obtained a dark olive powder which dissolves in sulfuric acid at first with a brown color, which then gradually changes to olive-green. It forms a reddish-blue vat, which dyes vegetable fibers tints which, after suspension in air and soaping, are very fast green-olive to brown-olive. The product thus obtained corresponds to the general Formula III explained above.

Similar products are obtained by using other mono-brombenzanthrones, for example the Bz-1-bromo-6-methylbenzanthrone or a mixture of Bz-1-bromo-3-methyl- and Bz-1-bromo-7-methylbenzanthrone. The product obtained from the 6-methylbenzanthrone dyes cotton green-olive tints.

What we claim is:—

1. Process for the manufacture of dyestuffs of the anthraquinone series, consisting in condensing mono-brommethylbenzanthrones of the general formula

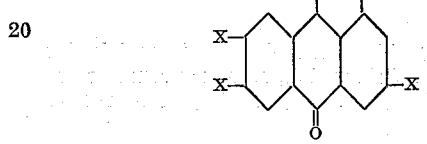

in which one X stands for a methyl group and the other two X's stand for hydrogen atoms, with a 1-aminoanthraquinone having an unoccupied 2-position, and after-treating the condensation product thus obtained with alkaline condensing agents.

2. The anthraquinone derivatives of the general formula

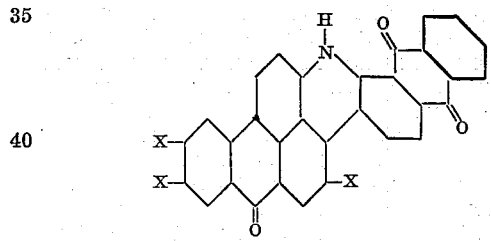

in which one X stands for a methyl group and the other two X's stand for hydrogen atoms, which products are dark olive powders, dissolving in sulfuric acid at first to a brown solution which then gradually changes to olive-green, and forming reddish-blue vats from which vegetable fibers are dyed fast green-olive to brown-olive tints.

3. A mixture of the three dyestuffs corresponding to the formula

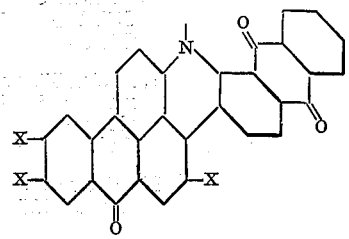

in which one X stands for a methyl group and the other two X's stand for hydrogen atoms, which products are dark olive powders, dissolving in sulfuric acid at first to a brown solution which then gradually changes to olive-green, and forming reddish-blue vats from which vegetable fibers are dyed fast green-olive to brown-olive tints.

4. The anthraquinone dyestuff of the formula

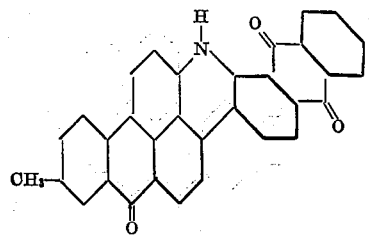

which product is a dark olive powder dissolving in sulfuric acid at first to a brown solution which then gradually changes to olive-green, and forming a reddish-blue vat from which vegetable fibers are dyed fast green-olive tints.

WILHELM MOSER.
WALTER FIORONI.